(12) United States Patent
Hirose et al.

(10) Patent No.: US 7,839,299 B2
(45) Date of Patent: Nov. 23, 2010

(54) REMOTE CONTROL DEVICE, REMOTE CONTROL METHOD, AND REMOTELY CONTROLLED DEVICE

(75) Inventors: Koji Hirose, Hirakata (JP); Ryuichi Sakai, Hirakata (JP)

(73) Assignee: Panasonic Corporation, Osaka (JP)

( * ) Notice: Subject to any disclaimer, the term of this patent is extended or adjusted under 35 U.S.C. 154(b) by 546 days.

(21) Appl. No.: 10/530,478

(22) PCT Filed: Mar. 5, 2004

(86) PCT No.: PCT/JP2004/002786
§ 371 (c)(1),
(2), (4) Date: Apr. 6, 2005

(87) PCT Pub. No.: WO2004/082318
PCT Pub. Date: Sep. 23, 2004

(65) Prior Publication Data
US 2006/0044106 A1    Mar. 2, 2006

(30) Foreign Application Priority Data
Mar. 12, 2003    (JP) .................... 2003-066459

(51) Int. Cl.
G05B 23/02    (2006.01)
(52) U.S. Cl. ............... 340/825.69; 709/249; 709/225
(58) Field of Classification Search ............ 340/825.69, 340/3.54, 825.52, 825.21; 700/17; 709/208, 709/225, 249
See application file for complete search history.

(56) References Cited
U.S. PATENT DOCUMENTS

| 6,580,950 | B1 * | 6/2003 | Johnson et al. ............... 700/17 |
| 6,889,264 | B2 * | 5/2005 | Clough et al. ................. 710/15 |
| 2002/0055977 | A1 * | 5/2002 | Nishi ........................ 709/208 |
| 2002/0063633 | A1 * | 5/2002 | Park ....................... 340/825.69 |
| 2002/0111698 | A1 * | 8/2002 | Graziano et al. .............. 700/17 |
| 2002/0156899 | A1 * | 10/2002 | Sekiguchi ................... 709/227 |
| 2003/0140136 | A1 | 7/2003 | Nakamura |
| 2004/0006647 | A1 * | 1/2004 | Kim et al. ................... 709/249 |

FOREIGN PATENT DOCUMENTS

| JP | 11-113072 | 4/1999 |
| JP | 11-177611 | 7/1999 |
| JP | 2000-308152 | 11/2000 |
| JP | 2001-218188 | 8/2001 |
| JP | 3445986 | 6/2003 |

OTHER PUBLICATIONS

English Language Abstract of JP 2001-218188.
English Language Abstract of JP 2000-308152.
English Language Abstract of JP 11-177611.
English Language Abstract of JP 11-113072.

* cited by examiner

*Primary Examiner*—Brian A Zimmerman
*Assistant Examiner*—Nabil H Syed
(74) *Attorney, Agent, or Firm*—Greenblum & Bernstein, P.L.C.

(57) ABSTRACT

A remote control system detects an operating status of various devices through the Internet in real time. A remote controller, which enables a terminal device to control an operation of a device through a network, acquires and stores a latest address of the device by communicating with the device at predetermined time intervals through the network. A status notification request referring to the stored address is transmitted through the network. In response, the remote controller receives status information from the device, stores the status information received from the device, and transmits the stored status information to the terminal device through the network.

10 Claims, 10 Drawing Sheets

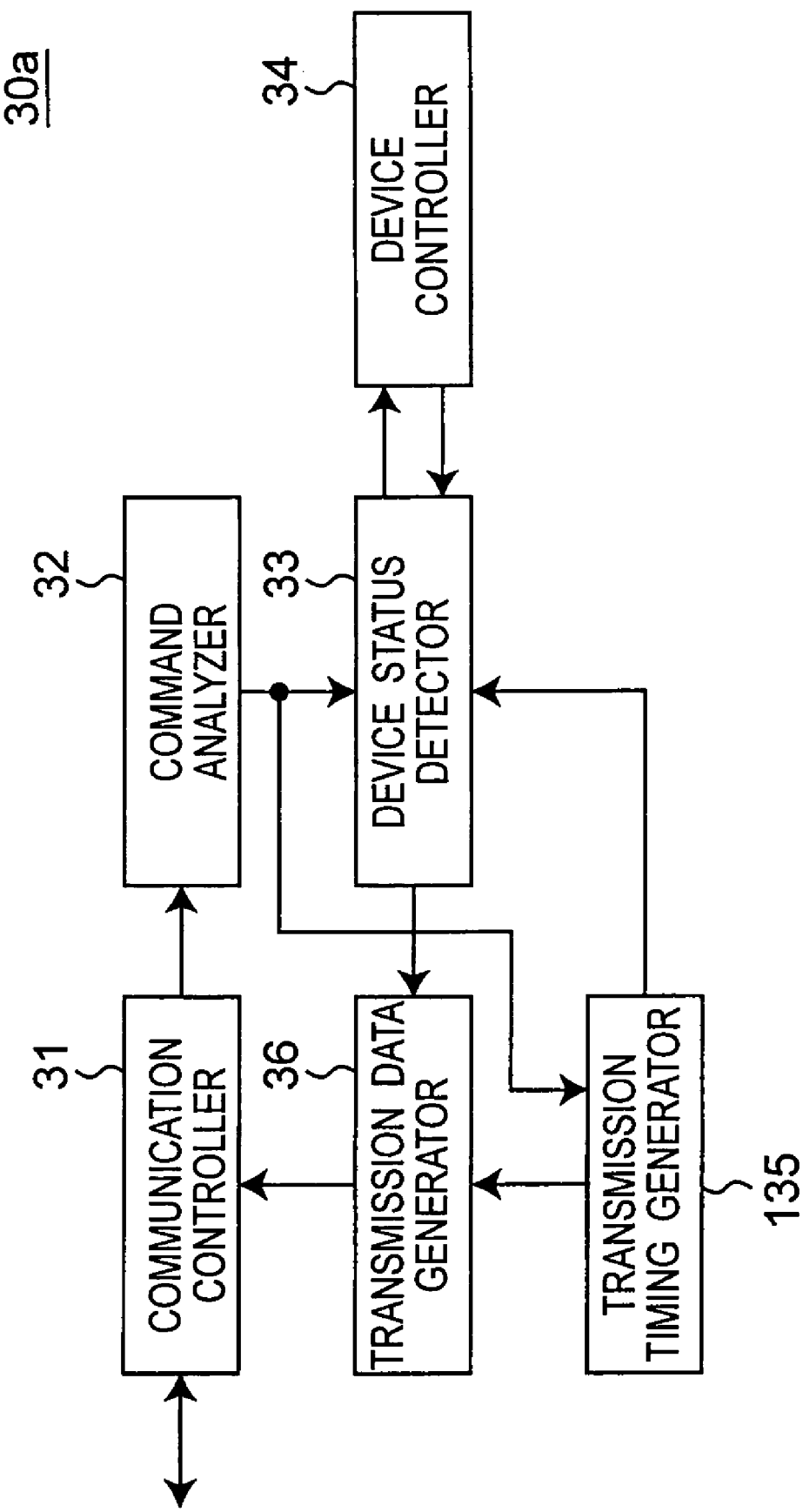

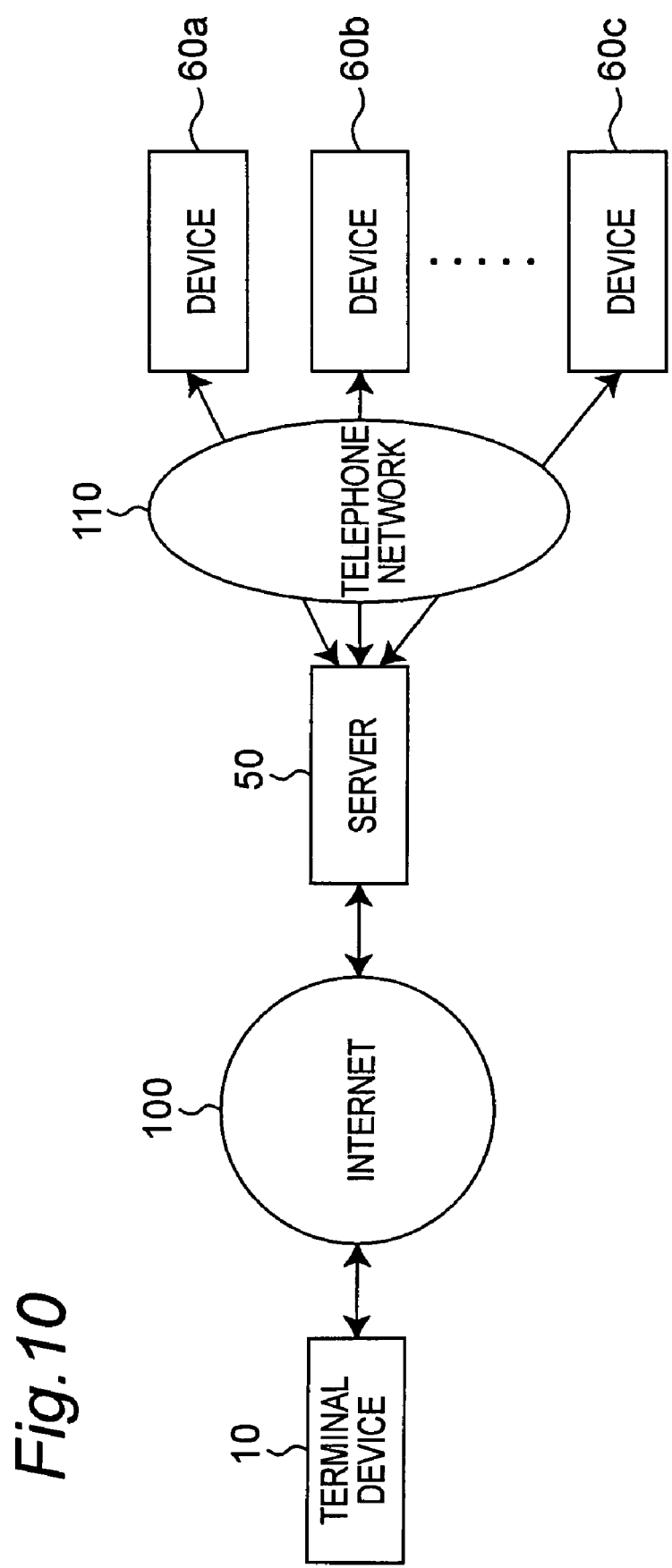

REMOTE CONTROL DEVICE, REMOTE CONTROL METHOD, AND REMOTELY CONTROLLED DEVICE

TECHNICAL FIELD

The present invention relates to a remote control technique which enables an external terminal device to control an in-home device at a remote location through the Internet.

BACKGROUND ART

There is conventionally known the following method as a method for recognizing a status of use of a device present at home from a remote location using the Internet.

The device present in the house stores data indicating a status of the device in a storage memory included in the device. Whenever a free-space capacity of this storage memory is zero or at predetermined timing, the device is connected to the Internet by a dial-up access, and the data indicating the status of the device is transmitted to a server through the Internet.

According to such a method, each device has to mount therein a storage memory and to further include a dial-up circuit. Japanese Patent Application Laid-Open No. 2001-218188 discloses such a technique.

An device status management method for a conventional remote control system will be described below.

FIG. 10 shows a system configuration of a conventional remote controller.

A terminal device 10 which enables a user to view a WEB screen through the Internet, such as a personal computer (PC) or a cellular telephone, is connected to the Internet 100. "WEB" is an abbreviation of World Wide Web, and "WEB screen" means information described in HTML (Hyper Text Markup Language) or the like and displayed. A server 50 which serves as a remote controller and devices 60a, 60b, and 60c serving as remote-controlled devices communicable with the server 50 through a telephone line 110 are connected to the Internet 100.

If the device 60a is a recording and reproducing device and when the user issues a recording command or a reproducing command to the device 60a, a status of the device 60a is changed. The changed status of the device is recorded, as device status data, in a predetermined recording medium within the device 60a, and then transmitted to the server 50 at predetermined timing. The device 60a is connected to the server 50 by the dial-up access.

The server 50 collects and stores the device status data transmitted from the device 60a. In this way, after the device status data is successively and temporarily stored in the device 60, the data is transmitted to the server 50 by the dial-up access.

When the user acquires the device state, the user requests the server 50 to transmit the device status using the terminal device 10. The server 50 transmits the device status data matching the user's request among those stored therein to the terminal device 10. The terminal device subjects the received device status data to a necessary processing such as transformation of the data into a graphic format, and then displays the resultant data.

DISCLOSURE OF THE INVENTION

Technical Problems to be Solved

With this configuration, however, the device needs to mount therein a memory having a certain amount of capacity and a circuit for the dial-up access, which disadvantageously hampers reduction in a manufacturing cost of the device. In addition, due to the use of the dial-up access, an ordinary conversation by phone cannot be held during communication. As a result, it is necessary to decrease the number of times of communication and it is difficult to know a status of use of each device in approximately real time. Therefore, according to the conventional configuration, the device status can be known only at a timing limited by (or set to) the device, that is, a memory capacity, the number of times of communication, or the like.

In order to solve these problems, an object of the present invention is to provide a remote control system capable of detecting a status of use for each device in real time through the Internet.

Method for Solving Problems

A remote controller according to the present invention is a controller which enables a terminal device to control an operation of a device through a network. The remote controller includes an address storage operable to acquire a latest address of the device on the network by communicating with the device at predetermined time interval through the network, and to store the acquired address, a first communication controller operable to refer to the address stored in the address storage, transmit a status notification request for requesting a notification of a status of the device to the device through the network, and receive status information indicating the status of the device in response to the status notification request from the device, a status storage operable to store the status information received from the device, and a second communication controller operable to transmit the stored status information on the device to the terminal device through the network.

The first communication controller may transmit the status notification request to the device at a timing the terminal device requests the status of the device.

Alternatively, the first communication controller may transmit the status notification request to the device at constant time intervals.

The device may transmit the status information on the device to the first communication controller when the status of the device is changed.

A remote-controlled device according to the present invention is a device which is controlled by the remote controller described above, detects a status of a subject to be controlled in the remote-controlled device and transmits the detected status, as the status information on the device, to the terminal device, in response to the status notification request.

A remote control method according to the present invention is a method of controlling an operation of a device through a network. The method includes acquiring a latest address of the device on the network by communicating with the device at predetermined time intervals through the network, and storing the acquired address, referring to the stored address, and transmitting a status notification request for requesting a notification of a status of the device to the device through the network, receiving status information indicating the status of the device in response to the status notification request from the device, storing the status information received from the device, and transmitting the stored status information on the device to the terminal device through the network.

EFFECTS ADVANTAGEOUS OVER PRIOR ART

According to the present invention, an operating status of the remote-controlled device can be known and displayed in an operation environment near real time. In addition, since the remote-controlled device does not require means for storing and managing the status data, it is possible to reduce a cost of each device.

BRIEF DESCRIPTION OF THE DRAWINGS

FIG. 9 shows another example of the configuration of the remote-controlled device.
FIG. 10 shows a configuration of a conventional remote control system.

BEST MODE FOR CARRYING OUT THE INVENTION

An embodiment of a remote control system according to the present invention will be described hereinafter with reference to the accompanying drawings. It is noted that the remote control system described hereinafter can acquire an operating status of each device from a terminal at a remote location through a network.

Figure 1:
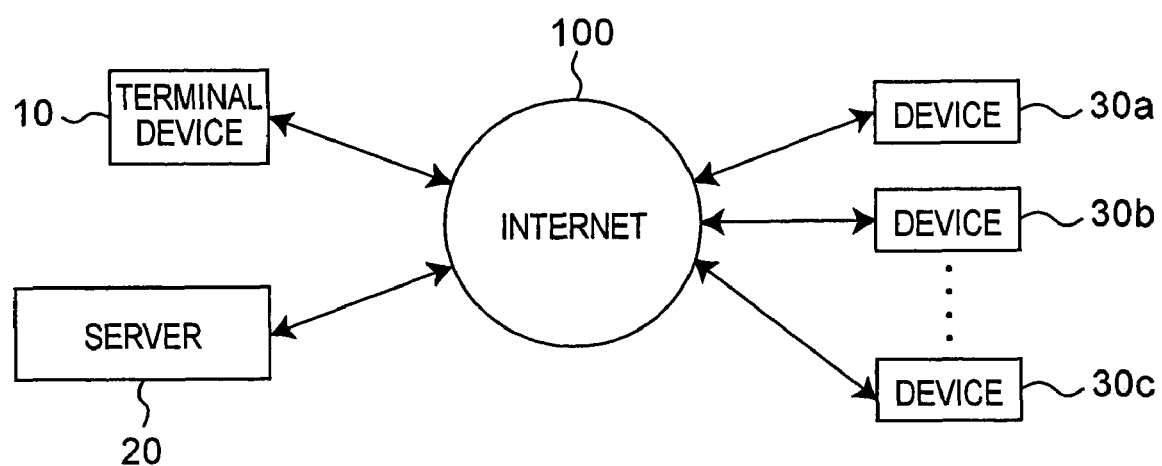
FIG. 1 shows a configuration of a remote control system according to the present invention.

FIG. 1 is a block diagram showing a configuration of the remote control system according to the present invention. A terminal device 10, a server 20, and devices 30a, 30b, and 30c are connected to one another through the Internet 100, thereby achieving communication among them.

The terminal device 10 is a terminal device such as a PC or a cellular telephone which can display a WEB screen acquired through the Internet 100. The server 20 is a remote controller which controls the devices 30a, 30b, and 30c through the Internet. Needless to say, if the terminal device 10 is the cellular telephone, the terminal device 10 can be connected to the Internet 100 through a cellular telephone network. Examples of the devices 30a, 30b, and 30c include a recording and reproducing device, an imaging device, a temperature controller such as an air-conditioner, and the other devices disposed in a house. There is no limit to the number of devices 30a, 30b, and 30c connected to the Internet.

Figure 2:
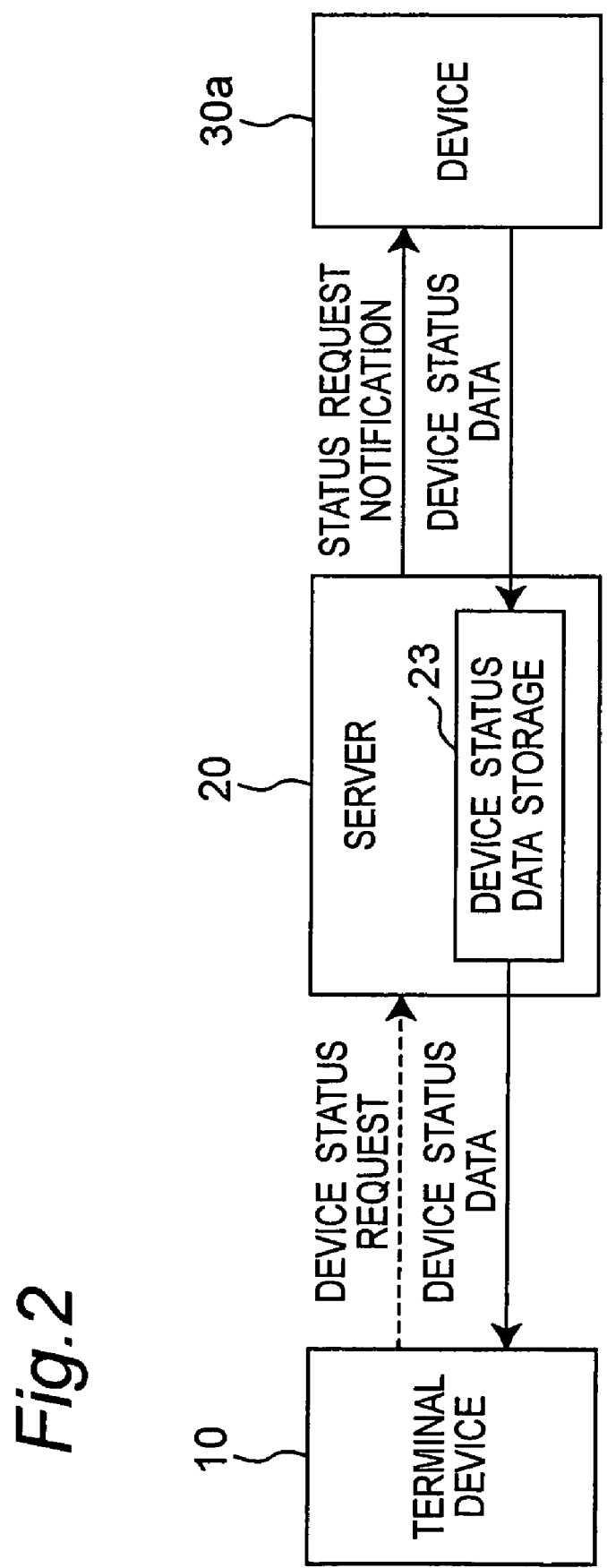
FIG. 2 is an explanatory view for a process outline of the remote control system.

FIG. 2 is an explanatory view for a processing outline of the remote control system in this embodiment, and for explaining a data flow among the terminal device 10, the server 20, and the device 30a. The device 30a spontaneously generates data indicating a status of the device 30a (hereinafter, "device status data") at a predetermined timing, and transmits the generated data to the server 20. The server 20 transmits a "state request notification" which is a command to request the device 30a to transmit information on the device status at a predetermined timing. The device 30a also generates the device status data and transmits the generated data to the server 20 when receiving the status request notification from the server 20. The server 20 collects and stores the device status data received from the device 30a. When receiving the device status notification request from the terminal device 10 through the Internet 100, the server 20 refers to the stored device status data and transmits to the terminal device 10 the data according to the device status notification request, and then the terminal device 10 displays the data. The "device state" means an operating status of the device, including: for example, states of stop, recording operation and reproducing operation for the device which is a recording and reproducing device; and a setting, a temperature, and the like for the device which is a temperature controller such as an air-conditioner.

Figure 3:
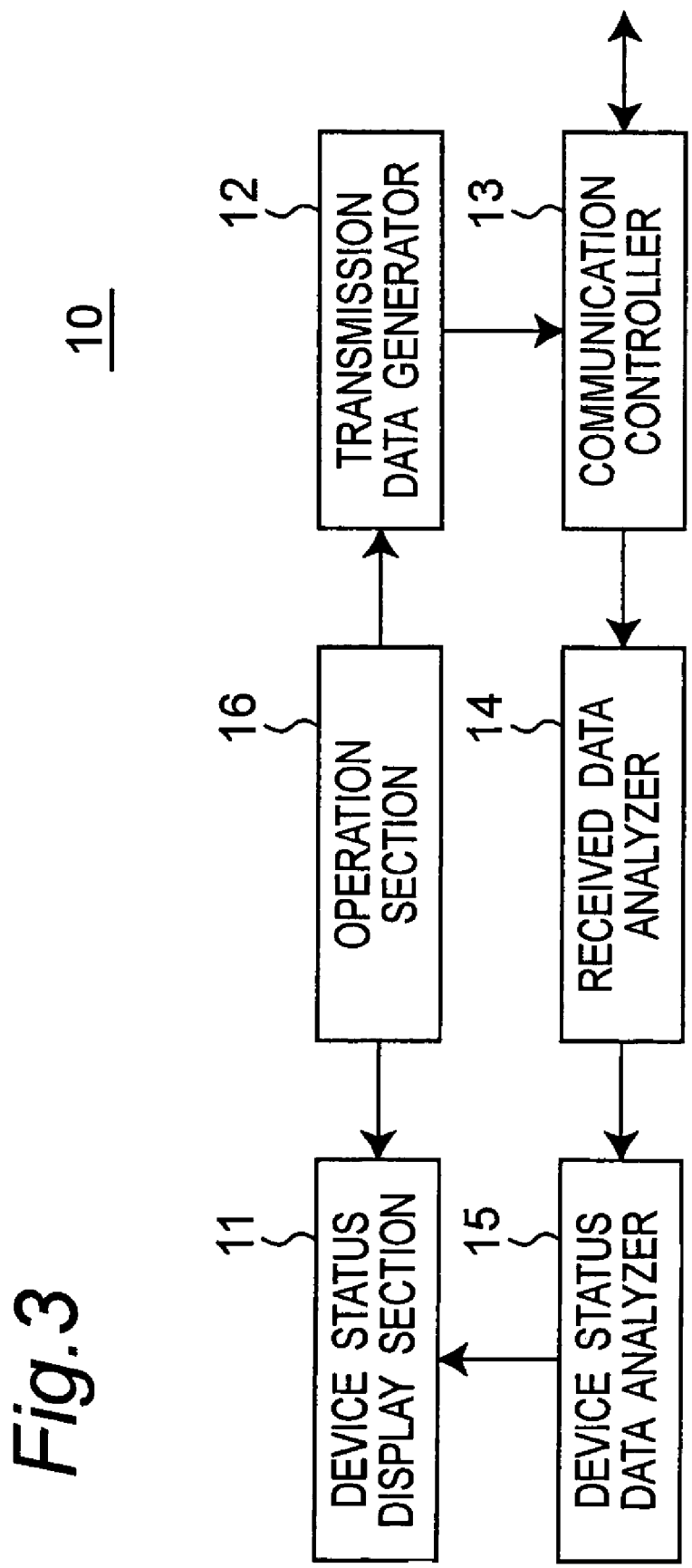
FIG. 3 shows a configuration of a terminal device.
Figure 4:
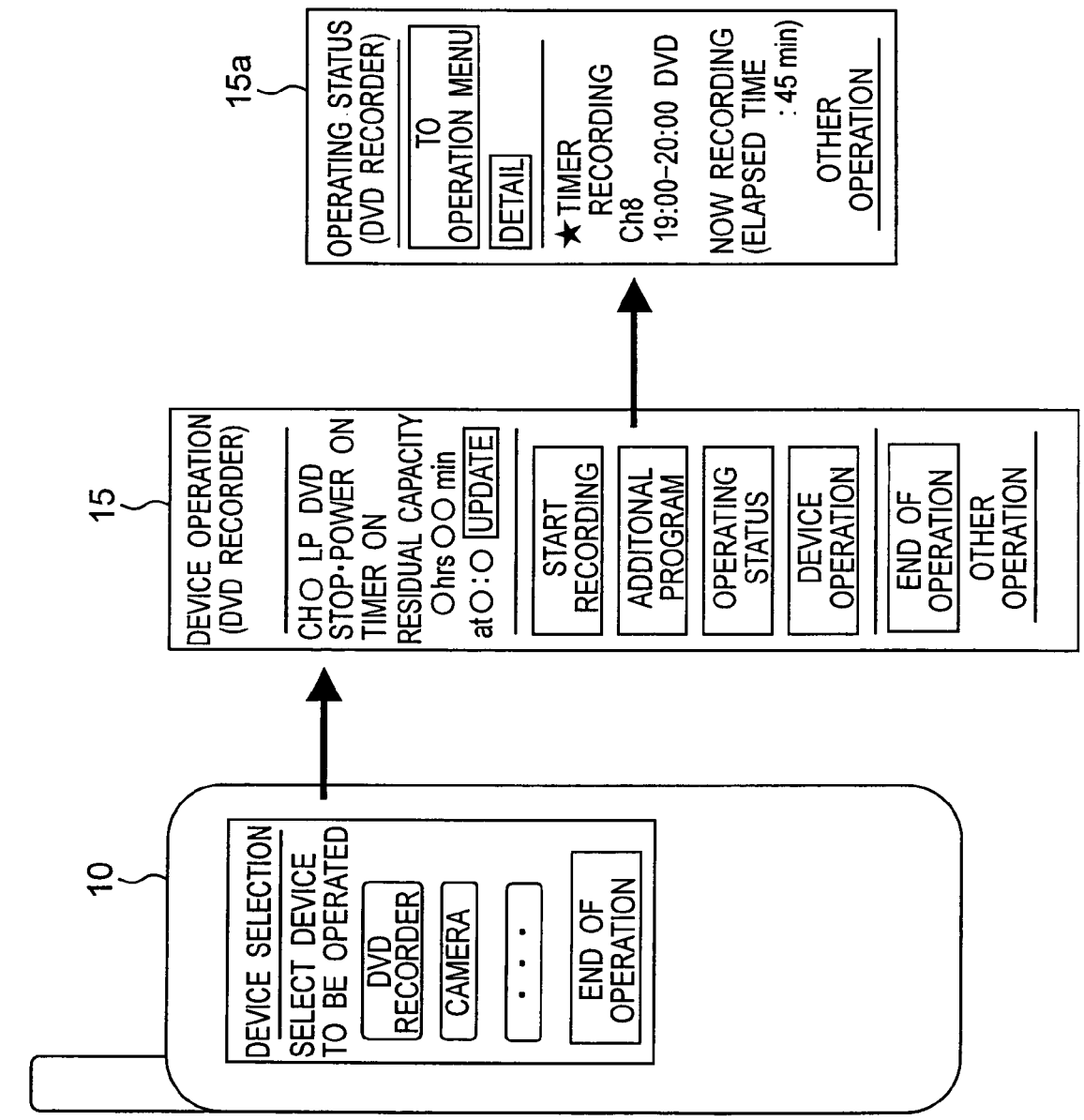
FIG. 4 shows one example of a WEB screen displayed on the terminal device (cellular telephone) when the terminal device (cellular telephone) checks an operating status of a device (a DVD recorder).

FIG. 3 shows a configuration of the terminal device 10. The terminal device 10 includes a device status display section (a so-called browser function) 11 which displays the WEB screen, a transmission data generator 12 which generates a command to be transmitted to the device on the Internet 100, and a communication controller 13 which connects the terminal device 10 to the Internet 100. The terminal device 10 also includes a received data analyzer 14 which analyzes data received from the Internet 100, a device status data analyzer 15 which analyzes the data indicating the device state and processes the data into a format facilitating user's viewing such as transformation of the data into a graphic format, and an operation section 16 on which the user operates the device 10 such as a screen operation while viewing display of the device status display section 11. Information from the operation section 16 is output to the device status data display section 11 and the transmission data generator 12. FIG. 4 shows one example of the WEB screen displayed on the terminal device (cellular telephone) 10 when the operating status of the device (DVD recorder) 30a is checked from the terminal device (cellular telephone) 10. The user can conduct an operation for requesting an operating status with the screen 15 displayed on the terminal device 10 and check the operating status on the screen 15a.

Figure 5:
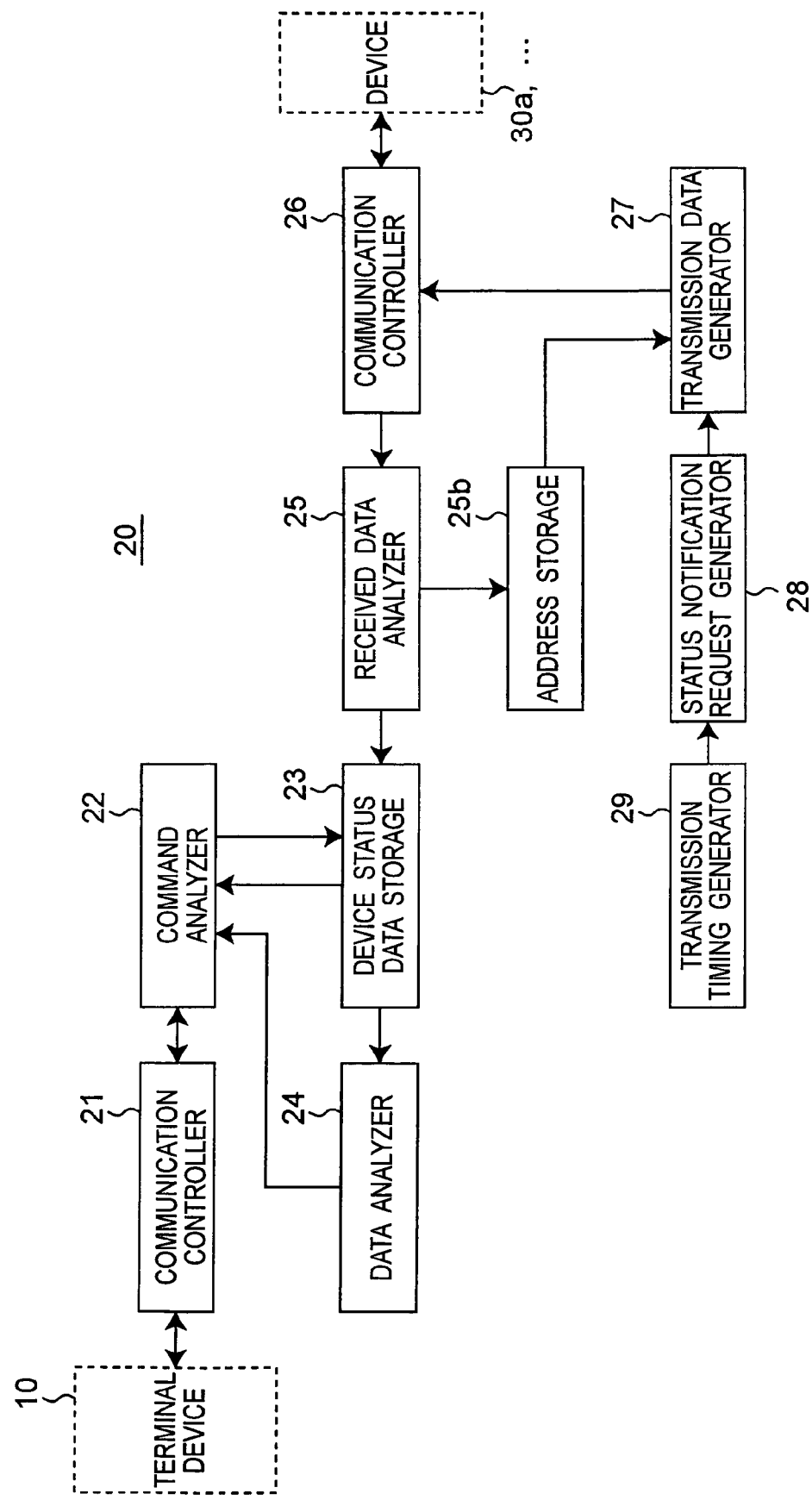
FIG. 5 shows a configuration of a server.

FIG. 5 shows a configuration of the server 20. In FIG. 5, the server 20 includes a communication controller 21 which enables the server 20 to communicate mainly with the terminal device 10 through the Internet 100, a command analyzer 22 which analyzes a command transmitted and received by the communication controller 21, and a device status data storage 23 which stores status data transmitted from the device 30a or the like. The server 20 also includes a data analyzer 24 which fetches the status data stored in the device status data storage 23 and processes the data so as to transmit the data to the terminal device 10 on the Internet 100, a received data analyzer 25 which analyzes a command received from each device 30a, . . . or the like through the Internet 100, an address storage 25b which stores specific addresses of each device 30a, on the Internet or the like, and a communication controller 26 which allows the server 20 to communicate mainly with each device 30a, . . . through the Internet 100. The server 20 further includes a transmission timing generator 29 which generates a predetermined timing, a status notification request generator 28 which generates a command for a status notification request in accordance with the timing (sign) output from the transmission timing generator 29, and a transmission data generator 27 which converts the status notification request from the status notification request generator 28 into a command on the Internet 100.

Figure 6:
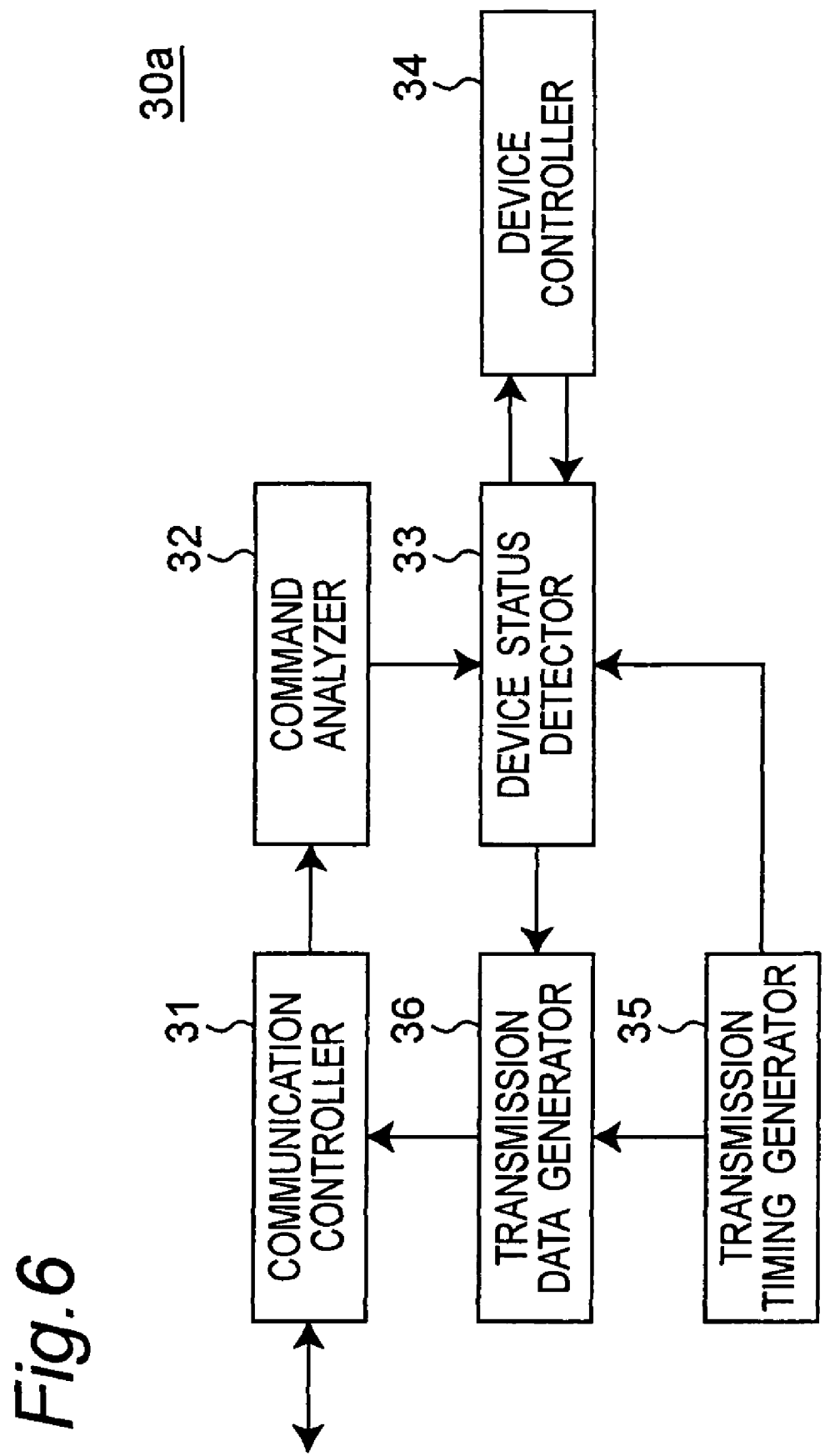
FIG. 6 shows a configuration of a remote-controlled device.

FIG. 6 shows a configuration of the device 30a. As shown in FIG. 6, the device 30a includes a communication controller 31, a command analyzer 32 which analyzes a command received by the communication controller 31, and a device status detector 33 which detects the device status based on information from a device controller 34. The device 30a also includes the device controller 34 which controls a subject to be controlled by the device, a transmission timing generator 35 which measures a predetermined time interval, and a transmission data generator 36 which converts data indicating the device status into a predetermined data format for the Internet 100. It is noted that the devices 30b and 30c have the same configuration to the device 30a, and therefore the present invention will be described hereinafter while mainly referring to the device 30a.

The communication controller of each of the terminal device 10, the server 20, and the device 30a, . . . is a section that provides a function of connecting to the Internet 100. Regarding the connection between the device 30a . . . and the Internet 100, various cases such as the use of a telephone line, the use of wireless communication, the use of a cable TV line, and the use of an optical fiber cable are assumed.

In this embodiment, for convenience of explanation, the server 20 includes a plurality of communication controllers 21 and 26. Alternatively, these communication controllers can be integrated into one communication controller.

Operations of the remote control system according to the present invention will next be described in detail. It is assumed herein that the device 30a is a recording and reproducing device such as a DVD recorder.

The device 30a transmits the device status data to the server 20 either spontaneously or when receiving the status notification request from the server 20.

First, a processing for spontaneously transmitting the device status data will be described. When the user commands the device 30a to conduct a recording operation or a reproducing operation, the device controller 34 of the device 30a controls a subject to be controlled in the device so as to conduct recording operation, reproducing operation, menu display or the like. When the operating status of the device 30a is thereby changed, the device status detector 33 detects that the operating status is changed and notifies the transmission data generator 36 of the change of the operating status. When receiving the notification of the operating status change, the transmission data generator 36 generates data (device status data) regarding the changed status of the device, as transmission data, synchronously with the timing applied from the transmission timing generator 35. If an interval of timings applied from the transmission timing generator 35 is sufficiently set narrow, it is possible to generate the device status data which reflects the device status changed in real time.

The transmitted data generated by the transmission data generator 36 is transmitted to the server 20 through the communication controller 31. The server 20 receives the data through the communication controller 26. The received data analyzer 25 extracts the device status data from the received data and stores the data in the device status data storage 23. In this way, the device status data is transmitted from the device 30 to the server 20 at the predetermined timing.

Next, A processing performed when the server 20 transmits the status notification request to the device 30a at the predetermined timing will be described.

The server 20 includes the transmission timing generator 29, and generates timings at predetermined time intervals independently. Synchronously with the timings, the status notification request generator 28 generates the status notification request. The transmission data generator 27 refers to an address or the like of the device stored in the address storage 25b, generates transmitted data from the status notification request, and transmits the generated data to the device 30a through the communication controller 26.

When receiving the data from the server 20 through the communication controller 31, the device 30a detects a command from the received data by the command analyzer 22. If the command is the device status request, the command analyzer 22 transmits a command to notify the device status detector 33 of the device state. The device status detector 33 acquires a present device status from the device controller 34, and requests the transmission data generator 36 to generate transmission data including the acquired device status data. The transmission data generator 36 transmits the generated data to the server 20 through the communication controller 31. The server 20 stores the received device status data in the device status storage 23.

It is noted that the server 20 communicates with the device 30a at the predetermined timing by transmitting a status notification request to the device 30a at the predetermined timing, and by receiving a response to the request from the device 30a. The server 20 detects the specific address of the device on the Internet 100, a device number (also referred to as "device ID") for identifying the device itself, and a port number of the device from communication packets transmitted during the communication using the received data analyzer 25, and stores them in the address storage 25b while making them associated with one another. Even if the specific address of the device 30 on the Internet dynamically changes, it is possible to recognize the latest specific address of the device 30a by referring to the address storage 25b. It is thereby possible to hold real-time data communication through the Internet between the server 20 outside of the house and the device 30a present in the house (see Japanese Patent No. 3445986).

A processing performed when the terminal device 10 requests the device status data will be described.

When the user tries to process the device status such as transforming the data into a graphic format or to view the device state, the user conducts an operation for requesting display of a device status with the operation section 16 on a menu screen displayed on the device status display section 11 of the terminal device 10.

As a result of this user operation, a data acquisition request which indicates that the terminal device 10 is to display the device status data is transmitted from the terminal device 10 to the communication controller 21 of the server 20 through the transmission data generator 12 and the communication controller 13. When the command analyzer 22 detects that the received data is the data acquisition request, the server 20 acquires the device status data according to the data acquisition request from the device status data storage 23. The server 20 transmits the acquired device status data to the terminal device 10 through the communication controller 21. The acquired device status data may be analyzed by the data analyzer 24 and then transmitted to the terminal device 10, if necessary.

The terminal device 10 extracts the device status data from the received data with the received data analyzer 14, subjects the device status data to the necessary processing such as the transformation of the data into a graphic format with the device status data analyzer 15, and then displays the resultant data with the device status display section 11.

As can be understood, according to this embodiment, the server 20 transmits the status notification request to the device 30*a* through the Internet 100 at the predetermined timing, receives from the device 30 the status data transmitted in response to the status notification request, stores the received status data in the device status data storage 23, and transmits the stored status data (or analyzed or processed status data) to the terminal device 10 operable to display the WEB screen. It is thereby possible to acquire the device status of the device 30 in real time. Further, the device 30 returns the status data to the server 20 in response to the status notification request form the server 20, thereby eliminating the use of means for storing and managing the status data, and reducing the manufacturing cost of the device.

Figure 7:
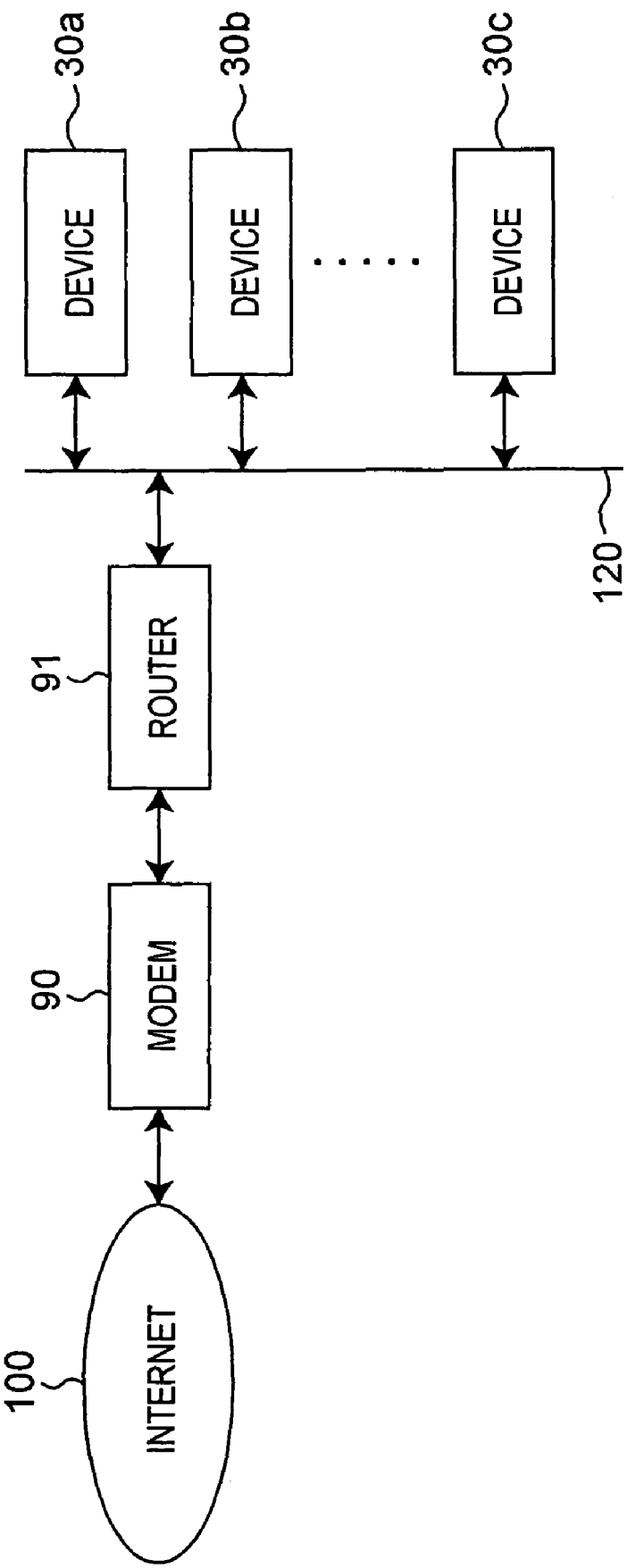
FIG. 7 shows one example of connection of a plurality of devices disposed in the same house.

The devices 30*a*, 30*b* and 30*c* may be present in the same house or different houses (that is, under management of different users). If the devices 30*a*, 30*b* and 30*c* are present in the same house, then these devices may be connected to one another by a local area network 120 and also connected to the Internet 100 through a router 91 and a modem 90 for ADSL (Asymmetric digital subscriber line) etc., as shown in FIG. 7.

In this embodiment, the server 20 is arranged so as to transmit the status notification request at the individual timing generated by the transmission timing generator 29. Alternatively, the server 20 may be arranged so as to transmit the status notification request at a timing at which the terminal device 10 requests the device status data.

Figure 8:
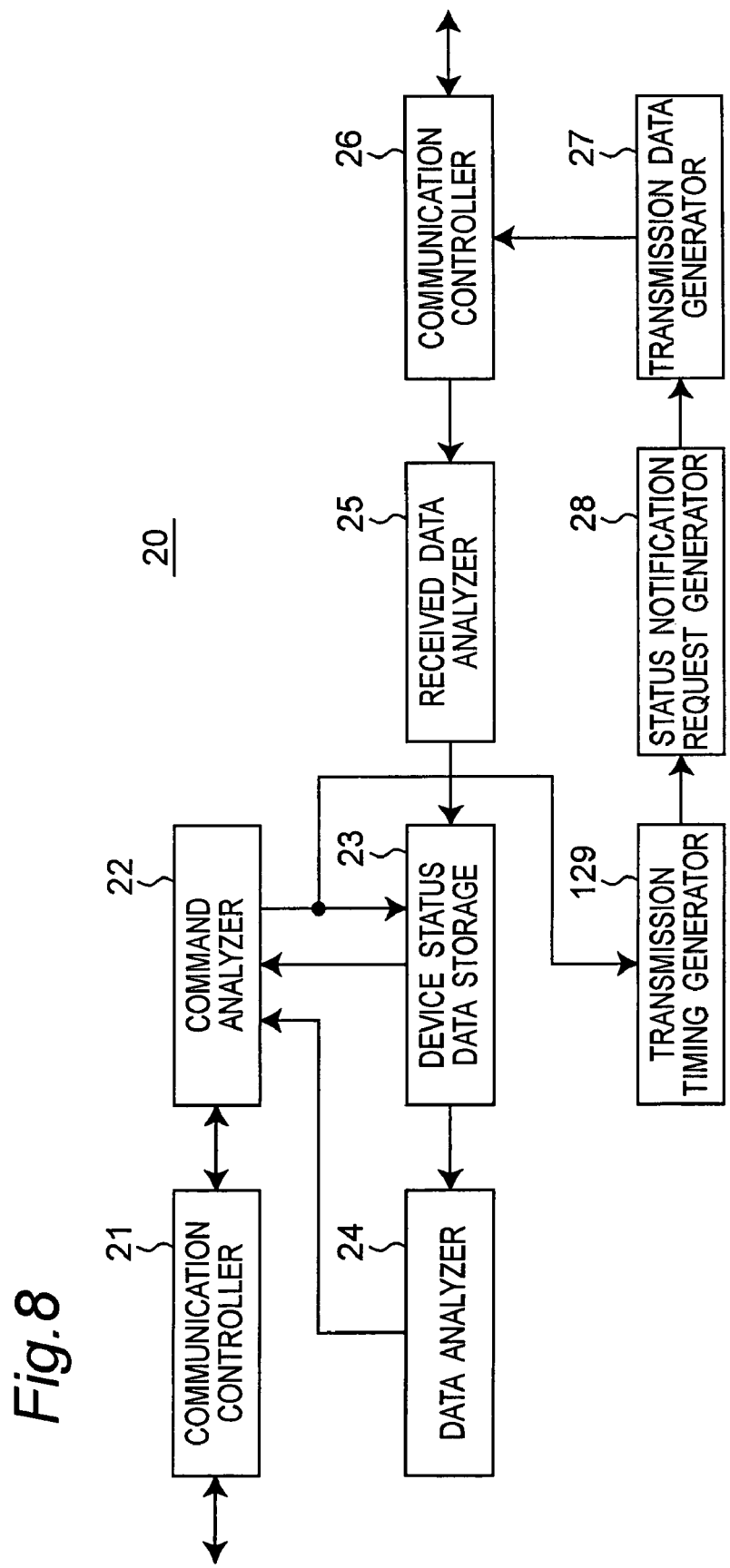
FIG. 8 shows another example of the configuration of the server.

Further, the server 20 may be arranged so that the terminal device 10 can arbitrarily set the timing generated by the transmission timing generator 29. In this case, as shown in FIG. 8, for example, the command analyzer 22 detects information on the transmission timing and transmits the information to the transmission timing generator 129. This allows the transmission timing generator 129 to operate under control of the terminal device 10.

Further, although in the device 30*a* the transmission timing generator 35 measures the predetermined time interval and requests generation of the transmission data, the transmission timing generator 35 may request the generation of the transmission data in response to a request from the terminal device 10, and transmit the device status data. In this case, the server 20 transmits the status notification request to the device 30*a* when the terminal device 10 requests the device status data. Further, either the terminal device 10 or the server 20 can set the transmission timing of the device status data. In this case, as shown in FIG. 9, for example, the command analyzer 32 separates information on the transmission timing from the received data and transmits the information to a transmission timing generator 135. This allows the transmission timing generator 135 to operate under control of either the terminal device 10 or the server 20.

Although the above description is made to one example in which the Internet connects the server 20, the device 30*a*, ... and the terminal device 10, a network other than the Internet may be employed.

Needless to say, each of the server 20, the device 30*a*, ... and the terminal device 10 can be constituted by a computer, and the respective functions described above can be realized by executing predetermined programs.

INDUSTRIAL APPLICABILITY

The present invention is useful to a remote control system which controls the operating status of the device in a house from the terminal at a remote location through the Internet.

The present invention has been described while referring to the specific embodiment. However, it is obvious to those skilled in the art that many other modifications and changes can be made and that the present invention can be used for other purposes. Accordingly, the present invention is not limited to this specific disclosure but can be limited only by the accompanying claims.

The invention claimed is:

1. A remote controller which enables a terminal to control a remotely-controlled device through a network, the remote controller comprising:
    an address storage operable to acquire and store a current changeable address of the remotely-controlled device on the network received from the remotely-controlled device, which sends the current changeable address through the network at constant time intervals, and to associate the current changeable address of the remotely-controlled device with a fixed identification number of the remotely-controlled device that is stored in the address memory;
    a first communication interface operable to transmit, through the network at constant time intervals to the remotely-controlled device based on the current changeable address stored in the address storage, a status notification request, and operable to receive, from the remotely-controlled device in response to the status notification request, status information indicating a status of the remotely-controlled device;
    a status storage operable to store the status information received from the remotely-controlled device; and
    a second communication interface operable to transmit the stored status information to the terminal through the network in response to a status request from the terminal,
    wherein the first communication interface also receives other status data, spontaneously generated by the remotely-controlled device at sufficiently narrow predetermined timing intervals to reflect real time status changes in the remotely-controlled device, and
    wherein the terminal is operable to adjust the constant intervals that the remote controller transmits the status notification requests to the remotely controlled device.

2. The remote controller according to claim 1,
    wherein the first communication interface is operable to transmit the status notification request to the remotely-controlled device when the status request is received from the terminal.

3. The remote controller according to claim 1,
    wherein the remotely-controlled device is operable to transmit the status information indicating the status of the remotely-controlled device to the first communication interface upon a change in the status of the remotely-controlled device.

4. The remote controller according to claim 1,
    wherein the remotely-controlled device is operable to detect a status of a subject to be controlled in the remotely-controlled device, and to transmit, to the terminal in response to the status notification request, the detected status as the status information indicating the status of the remotely-controlled device.

5. A remote control method of controlling a remotely-controlled device through a network, the method comprising:
    acquiring and storing a current changeable address of the remotely-controlled device on the network received from the remotely-controlled device, which sends the current changeable address through the network at constant time intervals, and associating the current changeable address of the remotely-controlled device with a fixed identification number of the remotely-controlled device that is stored in the address memory;

transmitting, through the network at constant time intervals to the remotely-controlled device based on the stored current changeable address, a status notification request;

receiving, from the remotely-controlled device in response to the status notification request, status information indicating a status of the remotely-controlled device;

receiving, from the remotely-controlled device, other status data spontaneously generated by the remotely controlled device at sufficiently narrow predetermined timing intervals to reflect real time status changes in the remotely-controlled device;

storing the status information received from the remotely-controlled device; and transmitting the stored status information to a terminal through the network in response to a status request from the terminal, wherein the terminal is operable to adjust the constant intervals that the remote controller transmits the status notification requests to the remotely controlled device.

6. The remote control method according to claim 5, wherein the status notification request is transmitted to the remotely-controlled device when the status request is received from the terminal.

7. The remote control method according to claim 5, wherein the status information indicating the status of the remotely-controlled device is transmitted to the terminal upon a change in status of the remotely-controlled device.

8. The remote control method according to claim 5, further comprising:

detecting a status of a subject to be controlled in the remote-controlled device; and transmitting, to the terminal in response to the status notification request, the detected status as the status information indicating the status of the remotely-controlled device.

9. The remote controller according to claim 1, wherein the constant time intervals at which the remotely-controlled device sends the current changeable address through the network are different from the constant time intervals at which the first communication interface transmits the status notification request through the network.

10. The remote control method according to claim 5, wherein the constant time intervals at which the remotely-controlled device sends the current changeable address through the network are different from the constant time intervals at which the status notification request is transmitted through the network.

* * * * *